United States Patent [19]

Stafford

[11] 3,850,455

[45] Nov. 26, 1974

[54] STRAIN-LIMITING CONNECTOR
[75] Inventor: Warren J. Stafford, Peoria, Ill.
[73] Assignee: Caterpillar Tractor Co., Peoria, Ill.
[22] Filed: Nov. 17, 1972
[21] Appl. No.: 307,419

[52] U.S. Cl................. 285/114, 285/363, 285/368
[51] Int. Cl.......................... F16l 13/04, F16l 35/00
[58] Field of Search .......... 285/363, 368, 189, 185, 285/114, 116, 261, 45, 301

[56] References Cited
UNITED STATES PATENTS

| | | | |
|---|---|---|---|
| 1,477,560 | 12/1923 | Heeney | 285/368 X |
| 2,017,600 | 10/1935 | Lofton | 285/368 X |
| 2,768,847 | 10/1956 | Peyrin | 285/368 |
| 3,292,955 | 12/1966 | Luther | 285/261 |
| 3,761,114 | 9/1973 | Blakely | 285/368 |
| 3,764,170 | 10/1973 | Brown | 285/368 X |

Primary Examiner—Geo. V. Larkin
Attorney, Agent, or Firm—Ralph E. Walters

[57] ABSTRACT

A strain-limiting connector for releasably holding a removable object, such as a fluid conduit coupling or the like, in tightly clamped relation against a support member including a body of substantially rigid deflectable material mountable on the support member in a predetermined maximum stressed condition and having a gripping portion for engagement with the removable object; a stop on the body is in spaced relation to the gripping portion for engagement with the support member subsequent to engagement of the gripping portion with the removable object during mounting of the body on the support member to limit deflection of the body to a predetermined maximum stressed condition.

7 Claims, 4 Drawing Figures

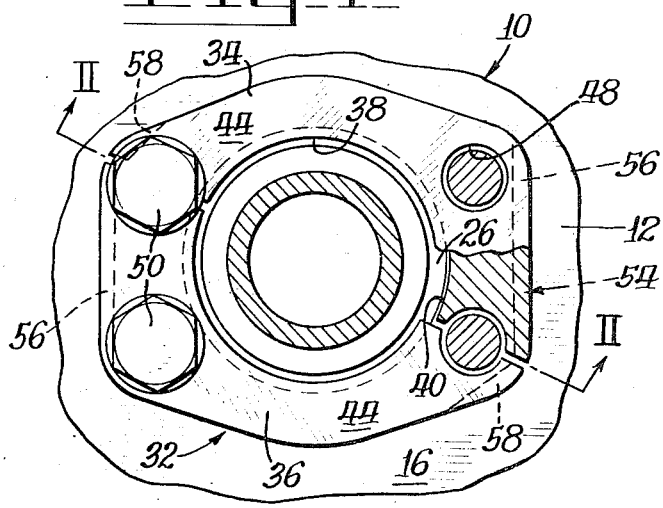
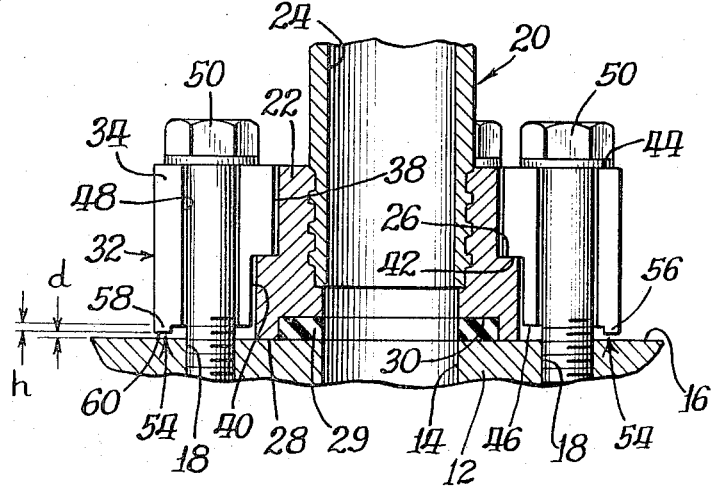
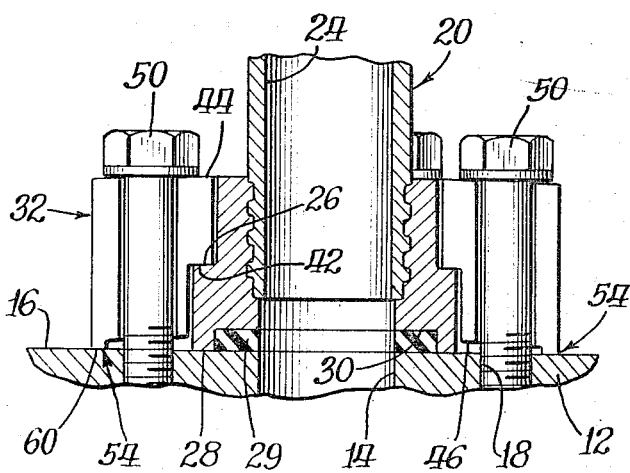
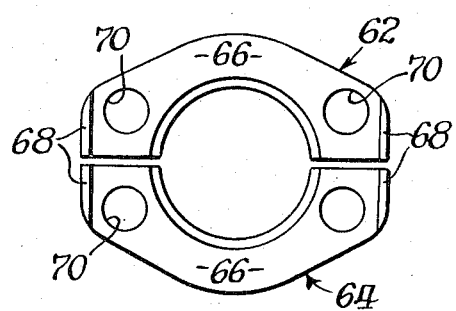

STRAIN-LIMITING CONNECTOR

BACKGROUND OF THE INVENTION

Circular flange connectors have been in wide use for coupling tubular pipes or hoses equipped with shouldered heads to a housing, manifold or the like. Unfortunately, flange distortion and failures have been experienced due to overtightening of the retaining bolts, which imposes excessive strain on the outermost portion of the flanged section between the bolt holes and which distorts the section in a wave-like manner. In some cases, a thicker flange section can be used to minimize such distortion with accompanying additional expense, while in other cases the thicker section will actually increase the encountered strain at the most severely stressed point.

Materials of greater strength can also be used to avooid the above-mentioned flange distortion problem, but adapting more sophisticated metals normally increases unit costs. Therefore, it is recognized that it would be desirable to limit the encountered maximum strain internally of the body of the flange even when the attaching bolts are overtightened because of using improperly adjusted, torque-limited impact wrenches or the like. Consequently, more economical materials and/or manufacturing steps can be adopted because of the increased reliability provided.

SUMMARY AND OBJECTS OF THE INVENTION

Accordingly, it is an object of the present invention to provide a strain-limiting connector for releasably holding an object in tightly clamped relation against a support member which is capable of minimizing the development of excessive internal stress so as to reduce connector failure.

Another object of the present invention is to provide such a strain-limiting connector which has a positive stop to limit distortion to a predetermined maximum internally stressed condition induced by a plurality of fastener bolts tightened beyond a recommended predetermined torque level.

Other objects and advantages of the present invention will become apparent upon reference to the accompanying drawings and following description.

BRIEF DESCRIPTION OF THE DRAWINGS

FIG. 1 is a plan view of the strain-limiting connector of the present invention connecting a removable relatively high pressure fluid conduit to a housing with portions thereof broken away for illustrative clarity.

FIG. 2 is a diametrical cross section taken along line II—II of FIG. 1 showing the connector in an initial pretightened position on the housing.

FIG. 3 is a sectional view similar to FIG. 2 but illustrating the connector in its fully tightened or maximum loaded position on the housing.

FIG. 4 is a bottom view of an alternate embodiment of the strain-limiting connector of the present invention.

DESCRIPTION OF THE PREFERRED EMBODIMENT

With reference to FIGS. 1 and 2, a strain-limiting connector 10 embodying the principles of the present invention is associated with a support structure or housing 12 such as a fluid manifold, valve body or the like. The housing has an outwardly opening passage 14 extended through an outer surface 16 on which the connector is supported. A plurality of threaded bolt holes 18 are provided in the housing in a generally encircling relation to the passage.

A tubular member 20, such as a relatively high pressure hydraulic fluid conduit or the like having a shouldered head 22 and an internal passage 24, is axially aligned with the passage 14 to permit fluid transfer therebetween in a well-known manner. The shouldered head includes a shoulder or bearing surface 26 facing away from the housing 12 and a surface 28 that is contiguously associated with the surface 16 of the housing. A suitable seal 29 is preferably disposed in a counterbore 30 in the shouldered head, and is loadably compressed against the surface 16 of the housing to prevent fluid leakage radially outwardly from the passages 14 and 24.

The strain-limiting connector 10 of the present invention provides a connecting body of substantially rigid deflectable material and is generally indicated by the reference numeral 32. The body is preferably split so that a pair of similar arcuate sections 34 and 36 are formed and which collectively provide a circular retaining flange. The arcuate sections have semicircular recesses collectively defining a central aperture 38 and a counterbore 40 and forming a ledge or bearing surface 42. The ledge faces inwardly toward the housing 12 in gripping relation to the shoulder 26, so that the connecting body can urge the shouldered head 22 in tightly clamped relation against the housing. The arcuate sections individually have an outer face 44 and an inner face 46, the latter of which is axiallly spced some distance away from the housing surface 16 when the bearing surfaces 26 and 42 are in abutting engagement. A plurality of bolt holes 48 in the flange sections permit insertion of a like number of fastening attachment bolts 50 therethrough into the threaded holes 18 of the housing.

The present invention includes one or more stops shown generally at 54 preferably extending toward the housing 16 from the marginal outer edge of the inner face 46 of each arcuate section 34 and 36. Such stops are peripherally spaced in a predetermined pattern around the connector which, as best shown in broken lines in FIG. 1, provides a relatively long lip 56 and a relatively short lip 58. These lips are disposed essentially radially outwardly of the bolts 50 on each of the arcuate sections. As shown in FIG. 2, the lips 56 and 58 individually have a surface 60 with a height $h$ as measured from the face 46 toward the housing 12. Such height $h$ provides a predetermined initial clearance $d$ between the stop 54 and housing surface 16 with the pretightened condition of the bolts 50 corresponding to the maximum axial distortion permitted the body 32 at the outer periphery thereof.

OPERATION

While the operation of the present invention is believed clearly apparent from the foregoing description, further amplification will subsequently be made in the following brief summary of such operation.

As previously described, excessive tightening of the fastener bolts of conventional flange connectors results in a wave-like bridging effect or undulating distortion of the periphery of the flanges. This causes excessive strain, particularly in the outer face thereof between the bolts. Even if the flange connector does not crack or otherwise fail due to such overloading, the undulating distortion results in less uniform loading which could be detrimental to effective sealing of the hydraulic circuitry.

On the other hand, the strain-limiting connector 10 of the subject invention avoids the overloading condition mentioned above as may be noted by a comparison of the pretightened and fully tightened bolt condition represented in FIGS. 2 and 3. The predetermined clearance $d$, shown in FIG. 2, observed when the connector body 32 initially grippingly engages the tubular member 20 and holds the surfaces 16 and 28 in intimate contact, decreases as the bolts 50 are individually threadably tightened. When the bolts are tightened to a predetermined recommended torque value, the lip surface 60 of each stop 54 contacts the surface 16 as shown in FIG. 3. Even though the bolts are tightened inadvertently beyond such value, the positive contact between each face 60 and the surface 16 of the housing 12 as well as the bearing surfaces 26 and 42 substantially form a substantially rigid bridge spaceably spanning each bolt which serves to limit excessive distortion of the connector body to the predetermined maximum internally stressed condition desired.

The subject invention also has the advantage of a larger radially inner axial clearance between the faces 46 and housing surface 16 so that surface irregularities therebetween can be bridged, rather than interfering with the desired resilient clamping action, thus assuring positive sealing of relatively high pressure fluid in the passages 14 and 24.

DESCRIPTION OF ALTERNATE EMBODIMENT

Although the split connector body shown in FIGS. 1 through 3 incorporates arcuate sections 34 and 36 individually having one long lip 56 and one short lip 58, the invention can be incorporated in other forms of segmented circular flanges such as shown in FIG. 4. Such an alternate embodiment includes a pair of arcuate flange sections 62 and 64 individually having a face 66 and a pair of lips 68 of similar intermediate length. The lips 68 also have a height $h$ similar to the preferred embodiment as measured from the face 66 and are disposed substantially radially outwardly of a plurality of bolt holes 70 defined in the flange sections to provide the bridging distortion-limiting feature of the subject invention.

Further, while marginally disposed elongated lips are preferred for more positive manufacturing reasons, it should also be appreciated that other forms of protrusions can be utilized to limit distortion of the circular flange in the manner set forth above.

In view of the foregoing, it is readily apparent that the structure of the present invention provides an improved strain-limiting connector of economical construction which controls distortion despite excessive loading of the attaching fasteners. Further, the distortion-limiting lips of the body of the present invention control the level of the maximum internal stress thereof even though the bolts are over-torqued. By controlling such stress and/or strain, the flange connector of the subject invention can be made of more economical, lower strength material.

While the invention has been described and shown with particular reference to a preferred and one alternate embodiment, it will be apparent that variations might be possible that would fall within the scope of the present invention, which is not intended to be limited except as defined in the following claims.

What is claimed is:

1. A strain-limiting connector comprising;
   a support member having an outer surface thereon;
   a removable object mountable in tightly clamped relation against said support member;
   a body of substantially rigid deflectable material mountable on said support member in a predetermined maximum internally stressed condition including gripping means for engagement with said removable object; and
   stop means on the body in spaced relation to said gripping means and being disposed in predetermined precisely outwardly spaced relation from said outer surface upon engagement of said gripping means with the removable object for delayed engagement of said stop means with said outer surface only after subsequent deflective movement of said body toward the support member to limit further deflection of said body to said predetermined maximum internally stressed condition.

2. The strain-limiting connector of claim 1 wherein said removable object is a tubular member having a shouldered head thereon adapted to be engaged by said gripping means.

3. The strain-limiting connector of claim 2 wherein said body is an arcuate flange section having a semicircular recess defining a ledge grippingly engaging said shouldered head.

4. The strain-limiting connector of claim 3 including fastener means mountably associated with said support member for holding said arcuate flange section against said tubular member.

5. A strain-limiting connector comprising;
   a support structure having a substantially flat outer face thereon;
   a tubular member having an elongated axis and being mountable in axially outwardly extended tightly held relation against said support structure and having a shouldered head thereon;
   a circular flange having a central aperature adapted to receive said tubular member therethrough;
   a counterbore circumscribing said aperture forming a shoulder within said flange;
   fastener means releasably connecting said flange to said support structure; and
   stop means on said flange defining a predetermined axial clearance with respect to said structure face when said shoulder is seated against the shouldered head of said tubular member upon a pretightened loading of said fastener means but contacting said structure face when a predetermined fully tightened loading condition is applied to said fastener means so that the development of internal stresses in said flange is limited even though said fastener means are thereafter loaded beyond said fully tightened condition.

6. The strain-limiting connector of claim 5 wherein said circular flange comprises at least two arcuate flange sections of similar shape.

7. A strain-limiting connector comprising;
   a housing having an outer surface with an internal passage opening on the surface and a plurality of threaded bores opening on the surface in substantially circumscribing relation to the passage;

a tubular member having an internal passage in aligned relation with said internal passage of said housing and including a shouldered head forming a bearing surface thereon, said tubular member providing a counterbore within said shouldered head;

seal means disposed in the counterbore;

a pair of arcuate flange sections having semi-circular recesses collectively defining a central aperture and a counterbore forming a bearing surface thereon with a plurality of bolt holes defined therein and a face spaced away from said housing surface;

a plurality of bolts insertable through said bolt holes into said threaded bores; and stop means on said section face and extending toward said housing in spaced relation therefrom to provide a predetermined clearance between said stop means and said housing surface when the bolts are pretightened to hold said section bearing surface against said tubular member bearing surface and said seal means in engagement wiith said housing surface, and when the bolts are fully tightened to a predetermined loading condition said stop means contacting said housing surface so that the development of internal stresses in said flange sections is limited even though said bolts are loaded beyond the fully tightened condition.

* * * * *